(12) United States Patent
Hou et al.

(10) Patent No.: US 12,058,953 B1
(45) Date of Patent: Aug. 13, 2024

(54) SOIL REGULATION AND CONTROL DEVICE FOR PREVENTING GRASSLAND SOIL DEGRADATION

(71) Applicant: Shanxi Agricultural University, Taiyuan (CN)

(72) Inventors: Xiangyang Hou, Taiyuan (CN); Guohua Ren, Taiyuan (CN); Lixia Du, Taiyuan (CN); Caixia Wang, Taiyuan (CN); Bin Li, Taiyuan (CN)

(73) Assignee: SHANXI AGRICULTURAL UNIVERSITY, Taiyuan (CN)

( * ) Notice: Subject to any disclaimer, the term of this patent is extended or adjusted under 35 U.S.C. 154(b) by 0 days.

(21) Appl. No.: 18/523,242

(22) Filed: Nov. 29, 2023

(30) Foreign Application Priority Data

Feb. 13, 2023 (CN) .......................... 202310102241.6

(51) Int. Cl.
*A01B 49/06* (2006.01)
*A01C 7/00* (2006.01)
*A01C 7/06* (2006.01)

(52) U.S. Cl.
CPC ............ *A01C 7/008* (2013.01); *A01B 49/065* (2013.01); *A01C 7/06* (2013.01)

(58) Field of Classification Search
CPC .......... A01B 49/065; A01C 7/06; A01C 7/008
USPC ......................................................... 111/901
See application file for complete search history.

(56) References Cited

U.S. PATENT DOCUMENTS 3,367,293 A * 2/1968 Cox .......................... A01C 7/06
172/71
3,544,013 A * 12/1970 Dorfman ................... A01C 7/06
111/901

FOREIGN PATENT DOCUMENTS

| CN | 106941826 A | * | 7/2017 | |
|---|---|---|---|---|
| CN | 107396662 A | * | 11/2017 | ............... A01C 7/06 |
| CN | 108174642 A | * | 6/2018 | |
| CN | 108243644 A | * | 7/2018 | |
| CN | 108901223 A | * | 11/2018 | |
| CN | 109076737 A | * | 12/2018 | |

(Continued)

OTHER PUBLICATIONS

Office Action for Chinese Application No. 202310102241.6, Issued Mar. 16, 2023.

(Continued)

*Primary Examiner* — Alicia Torres
(74) *Attorney, Agent, or Firm* — Perilla Knox & Hildebrandt LLP; Jason M. Perilla

(57) ABSTRACT

A soil regulation and control device for preventing grassland soil degradation is provided, and relates to the field of grassland restoration. The soil regulation and control device includes a vehicle body arranged in a horizontal state; a reaction cylinder fixedly arranged above the vehicle body and accommodating fertilizer and water; a mixing and stirring mechanism connected with the reaction cylinder and fully mixing the fertilizer and water in the reaction cylinder a reciprocating water spraying mechanism arranged at a lower end of the mixing and stirring mechanism and spraying uniformly mixed fertilizer and water; and a loosening and sowing assembly including a reciprocating soil loosening mechanism connected with the reciprocating water spraying mechanism and loosening soil, and a vibrating sowing mechanism connected with the reciprocating soil loosening mechanism and scattering grass seeds on the loosened soil.

2 Claims, 6 Drawing Sheets

(56) References Cited

FOREIGN PATENT DOCUMENTS

| | | | | |
|---|---|---|---|---|
| CN | 109197123 A | * | 1/2019 | ............. A01C 23/04 |
| CN | 109362261 A | * | 2/2019 | ........... A01B 49/065 |
| CN | 110663321 A | | 1/2020 | |
| CN | 111587754 A | * | 8/2020 | |
| CN | 113068466 A | | 7/2021 | |
| CN | 215935494 U | * | 3/2022 | |
| CN | 218007037 U | | 12/2022 | |
| CN | 115769715 B | | 5/2023 | |
| CN | 117598051 A | * | 2/2024 | |

OTHER PUBLICATIONS

Notification to Grant Patent Right for Chinese Application No. 202310102241.6, Issued Apr. 13, 2023.

\* cited by examiner

SOIL REGULATION AND CONTROL DEVICE FOR PREVENTING GRASSLAND SOIL DEGRADATION

CROSS-REFERENCE TO RELATED APPLICATION

This application claims the priority of Chinese Patent Application No. 202310102241.6, entitled "SOIL REGULATION AND CONTROL DEVICE FOR PREVENTING GRASSLAND SOIL DEGRADATION" filed with the Chinese Patent National Intellectual Property Administration on Feb. 13, 2023, which is incorporated herein by reference in its entirety.

TECHNICAL FIELD

The present disclosure relates to the field of grassland restoration, in particular to a soil regulation and control device for preventing grassland soil degradation.

BACKGROUND

As an important component of grassland environmental resources, soil is the foundation of grassland vegetation growth, the supply and storage of water, fertilizer and gas necessary for plant growth, and the main place for material and energy conversion between plants and the environment. The treatment measures taken around the restoration of natural grassland degradation mainly aim at soil restoration and vegetation. For example, fertilization and plowing aim at improvement on soil environment, and over sowing and enclosure are focused on improving the status of grassland plant community, and improving soil nutrient conditions by improving the quantity and quality of litters returning to soil. Through artificial intervention, the common promotion between soil and plants can be rebuilt, soil nutrients are reaccumulated, high diversity of soil microbial community is restored, and then the stability of community and the integrity of ecosystem functions are improved, so that sustainable development of grassland ecosystem is realized.

In view of the regulation and control of grassland soil, the mode of "water and fertilizer optimization plus grass growth" is mainly adopted to regulate and control grassland soil, including applying proper amount of chemical fertilizer and bio-organic fertilizer at different times, planting grass and irrigating proper amount of water, so that the degradation of soil quality can be effectively improved, the irrigation technology is optimized, water and soil are kept reasonable, and the current problem of grassland soil quality decline is solved.

However, in the prior art, water and fertilizer optimization, soil plowing and grass seed sowing are generally carried out separately, and the grass seeds in the grassland soil with a degradation trend are fragile. In the regulation and control process, if traditional spraying methods are adopted, the fragile grass seeds may be burned to death by excess fertilizer. However, if the precision fertilization method such as drip irrigation is adopted, the grassland area is too large and thus the workload is overloaded. In view of this, a soil regulation and control device for preventing grassland soil degradation is designed. The device is high in integration and less in load, and can fully mix the mixed liquid and realize intermittent spraying. Furthermore, the device can also realize the three-in-one synchronization of water and fertilizer optimization, soil plowing and grass seed sowing.

SUMMARY

Base on this, it is required to provide a soil regulation and control device for preventing grassland soil degradation for the problems in the prior art.

In order to solve the existing technical problems, the technical scheme adopted by the present disclosure is as follows.

A soil regulation and control device for preventing grassland soil degradation includes:
a vehicle body arranged in a horizontal state;
a reaction cylinder which is fixedly arranged above the vehicle body and can accommodate fertilizer and water;
a mixing and stirring mechanism which is connected with the reaction cylinder and can fully mix the fertilizer and water in the reaction cylinder;
a reciprocating water spraying mechanism which is arranged at a lower end of the mixing and stirring mechanism and can spray uniformly mixed fertilizer and water;
a loosening and sowing assembly which includes a reciprocating soil loosening mechanism connected with the reciprocating water spraying mechanism and can loosen soil, and a vibrating sowing mechanism connected with the reciprocating soil loosening mechanism and being capable of scattering grass seeds on the loosened soil.

In some embodiments, a cylinder cover is arranged above the reaction cylinder. A feed inlet is formed in the cylinder cover. Four telescopic wheel seats and four anti-skid wheels are fixedly arranged below the vehicle body. The four telescopic wheel seats are fixedly connected with side walls of the vehicle body. The four anti-skid wheels are respectively fixedly connected with lower ends of the four telescopic wheel seats.

In some embodiments, the mixing and stirring mechanism includes a driving motor, a driving shaft, a first toothed disc, a first driving gear, a first driven gear and a fixed connecting rod. The first toothed disc is fixedly arranged at an upper end of the reaction cylinder. The cylinder cover is fixedly connected with the first toothed disc. The driving motor is arranged beside the feed inlet and fixedly connected with an upper end of the cylinder cover. The driving shaft is fixedly connected with an output end of the driving motor. The first driving gear is coaxially and fixedly connected with the driving shaft. The first driven gear is arranged beside the first driving gear. The first driven gear is simultaneously meshed with the first driving gear and the first toothed disc. One end of the fixed connecting rod is rotatably connected with the driving shaft, and the other end of the fixed connecting rod is rotatably connected with the first driven gear.

In some embodiments, the mixing and stirring mechanism further includes a second driving gear, a second driven gear, a second toothed disc, a plurality of first stirring rods and a plurality of second stirring rods. The second driving gear is fixedly connected with a lower end of the driving shaft. The second driven gear is arranged beside the second driving gear and meshed with the second driving gear. The second driven gear is connected with the first driven gear via a long shaft. The first stirring rods are uniformly arrayed along the circumferential direction of the second driving gear. One end of each of the first stirring rods is connected with the first driving gear, and the other ends of the first stirring rods are connected with the second driving gear. The second stirring rods are uniformly arrayed along the circumferential direction of the second driven gear. One end of each of the second stirring rods is connected with the first driven gear, and the other ends of the second stirring rods are connected with the second driven gear. The second toothed disc is meshed with the second driven gear. A lower end of the second toothed disc is fixedly connected with the vehicle body, and an upper end of the second toothed disc is fixedly connected with the reaction cylinder.

In some embodiments, the reciprocating water spraying mechanism includes a linkage stub shaft, a reciprocating sliding sleeve, two fixed pipe seats and two movable water pipes. A plurality of water nozzles are formed in the two movable water pipes. The linkage stub shaft is eccentrically connected with a lower end of the second driven gear. An inner wall of the reciprocating sliding sleeve is slidably connected with the linkage stub shaft. The two movable water pipes are fixedly and respectively connected with both ends of the reciprocating sliding sleeve via water valves. The two fixed pipe seats are invertedly mounted at the lower end of the second toothed disc. The two movable water pipes are slidably connected with the two fixed pipe seats respectively. The two movable water pipes are in dynamic sealing connection with an outer wall of the vehicle body.

In some embodiments, the reciprocating soil loosening mechanism includes a linkage rack, a reciprocating gear, a power worm, a driving bevel gear and two driven bevel gears. The linkage rack is fixedly connected with the lower end of the reciprocating sliding sleeve. The reciprocating gear is coaxially arranged with the driving shaft and meshed with the linkage rack. The power worm is coaxially and fixedly connected with the reciprocating gear. The power worm passes through a lower end of the vehicle body and is in dynamic sealing connection with the vehicle body. The driving bevel gear is fixedly connected with a lower end of the power worm. The two driven bevel gears are symmetrically arranged beside the driving bevel gear and meshed with the driving bevel gear.

In some embodiments, the reciprocating soil loosening mechanism further includes a bevel gear frame, two soil loosening plows, two fixed supports and two fixed seats. The bevel gear frame sleeves the driving bevel gear and the two driven bevel gears. One end of each of the two fixed supports is fixedly connected with the bevel gear frame, and the other ends of the two fixed supports are fixedly connected with the lower end of the vehicle body. First ends of the two soil loosening plows are respectively connected with the two driven bevel gears. Lower ends of the two fixed seats are respectively connected with second ends of the two soil loosening plows via bearings, and upper ends of the two fixed seats are connected with the lower end of the vehicle body.

In some embodiments, the vibrating sowing mechanism includes a power worm gear, a reciprocating rack, a blanking screen mesh, a grass seed material box and two limiting sliding seats. The power worm gear is arranged beside and meshed with the power worm. The reciprocating rack is arranged on the side, away from the power worm, of the power worm gear. The power worm gear is coaxially and fixedly connected with a helical gear. The helical gear is meshed with the reciprocating rack. Limiting chutes are formed in both sides of the reciprocating rack. The two limiting sliding seats are respectively arranged at both sides of the reciprocating rack and slidably connected with the limiting chutes. Upper ends of the two limiting sliding seats are fixedly connected with the lower end of the vehicle body. The grass seed material box is fixedly connected with the end, away from the power worm gear, of the reciprocating rack. The blanking screen mesh is fixedly connected with a lower end of the grass seed material box.

Compared with the prior art, the present disclosure has following beneficial effects.

Firstly, the device can directly pour fertilizer and water in the working process without pouring the mixed the fertilizer and water into the reaction cylinder, so that the working efficiency is improved.

Secondly, the device can fully mix fertilizer and water, and fully stir the inner and outer layers of the mixed liquid, so as to avoid the precipitation and accumulation of fertilizer residues due to the non-uniform mixing of fertilizer and water.

Thirdly, the soil nutrition of the degraded grassland is poor, and the available plants may be burned to death by excess fertilizer, so the device can realize intermittent spraying of the mixed liquid and avoid from destroying the available grass seeds on the grassland and the grass seeds to be sown on the grassland.

Fourthly, the device is high in integration level, can realize three-in-one function of water and fertilizer optimization, soil plowing and grass seed sowing, and can realize fertilizer and water stirring, soil loosening and seed sowing through one driving motor without loading other power sources, so that the overall weight of the device is reduced.

Reference signs: 1, vehicle body; 2, telescopic wheel seat; 3, anti-skid wheel; 4, reaction cylinder; 5, cylinder cover; 6, feed inlet; 7, mixing and stirring mechanism; 8, driving motor; 9, driving shaft; 10, first toothed disc; 11, first driving gear; 12, first driven gear; 13, fixed connecting rod; 14, first stirring rod; 15, second stirring rod; 16, second driving gear; 17, second driven gear; 18, second toothed disc; 19, reciprocating water spraying mechanism; 20, linkage stub shaft; 21, reciprocating sliding sleeve; 22, movable water pipe; 23, water nozzle; 24, fixed pipe seat; 25, loosening and sowing assembly; 26, reciprocating soil loosening mechanism; 27, linkage rack; 28, reciprocating gear; 29, power worm; 30, driving bevel gear; 31, driven bevel gear; 32, bevel gear frame; 33, fixed support; 34, soil loosening plow; 35, fixed seat; 36, vibrating sowing mechanism; 37, power worm gear; 38, reciprocating rack; 39, limiting chute; 40, limiting sliding seat; 41, grass seed material box; and 42, blanking screen mesh.

DETAILED DESCRIPTION OF THE EMBODIMENTS

In order to further understand the characteristics, technical means, specific purposes and functions of the present disclosure, the present disclosure is further described in detail in conjunction with the attached figures and embodiments.

Figure 1:
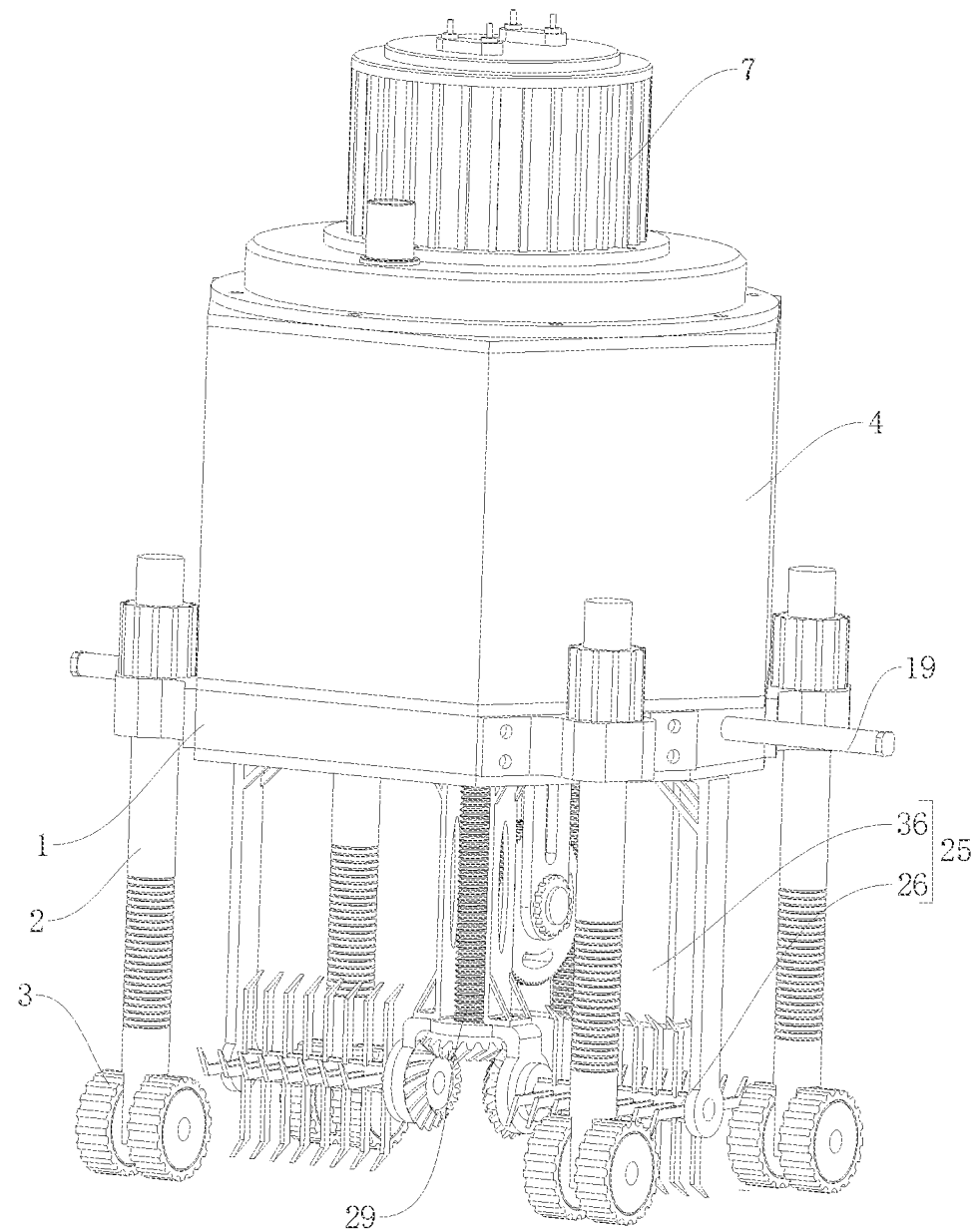
FIG. 1 is a front axonometric drawing of the device.
Figure 2:
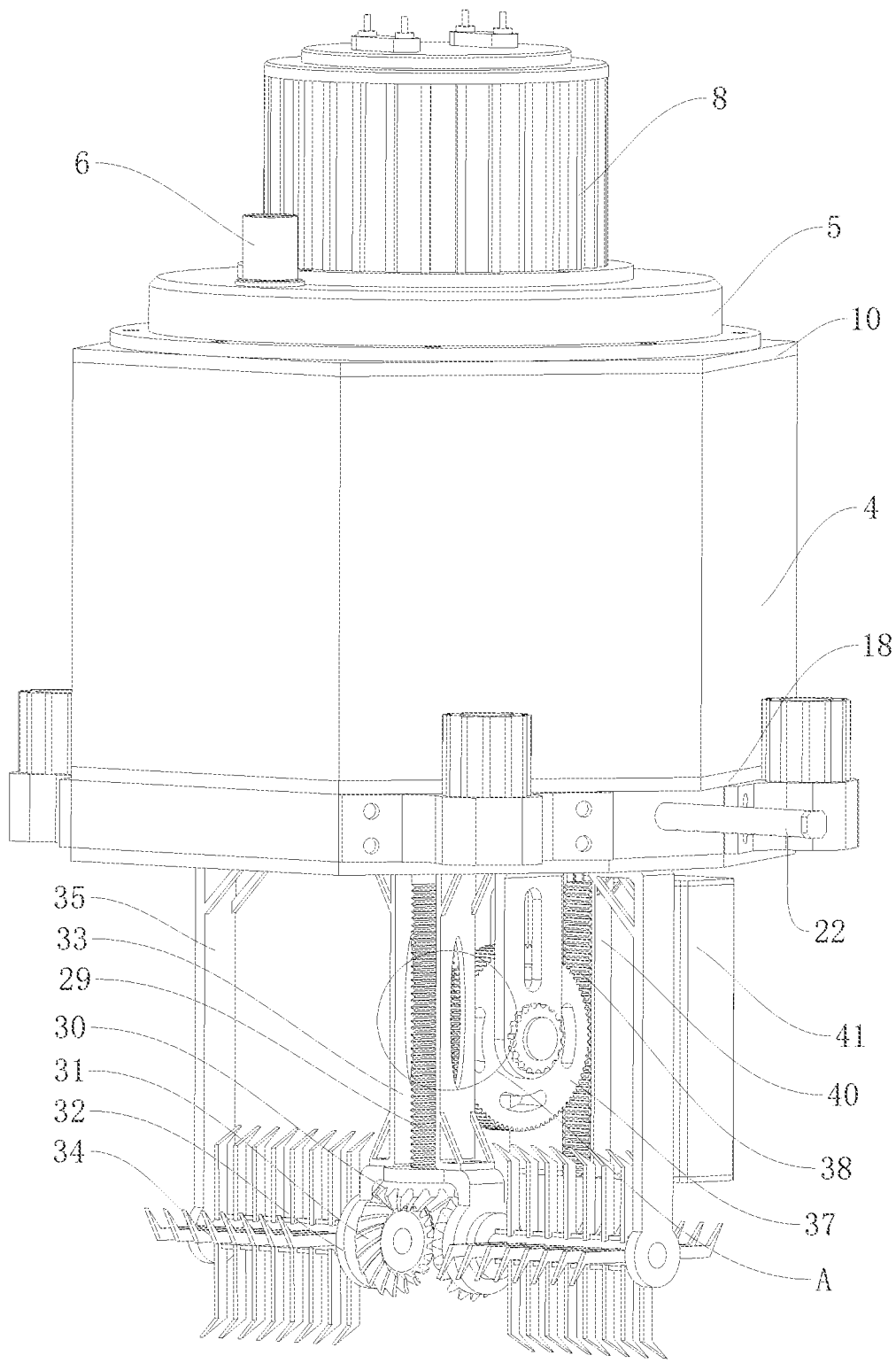
FIG. 2 is a side-looking axonometric drawing of the device.
Figure 3:
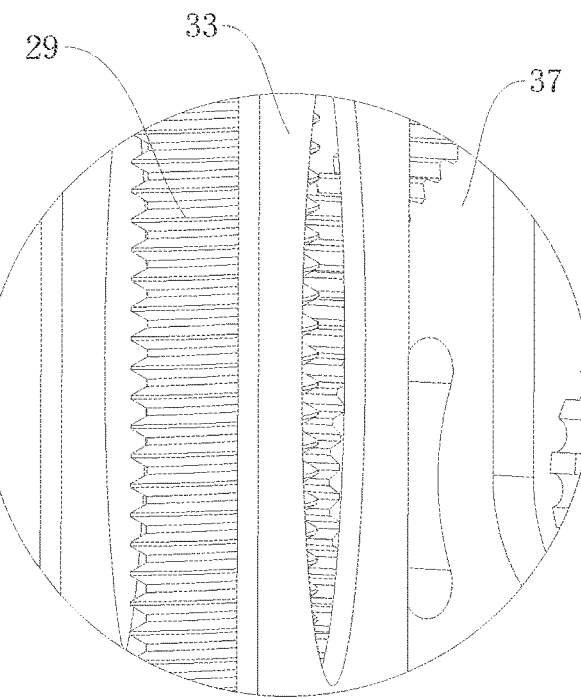
FIG. 3 is an enlarged drawing of part A in FIG. 2.
Figure 4:
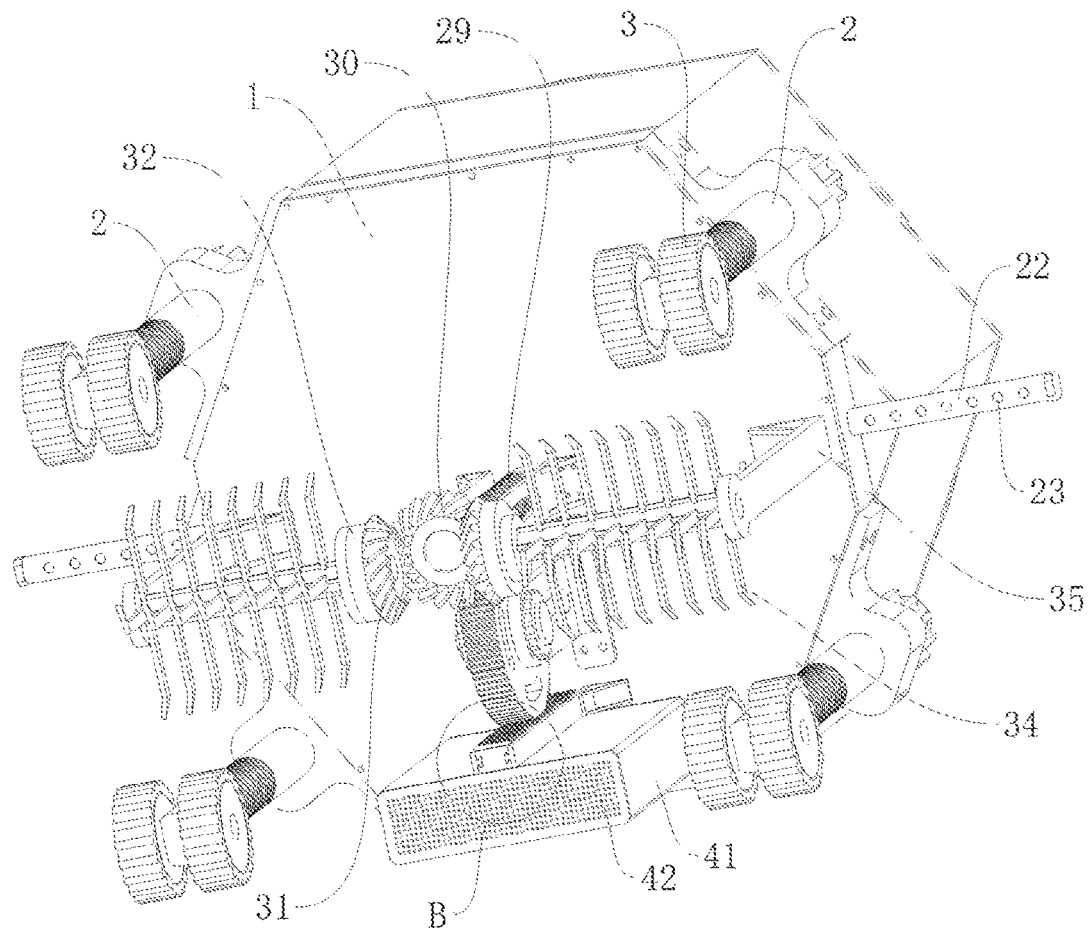
FIG. 4 is a bottom-looking axonometric drawing of the device.
Figure 5:
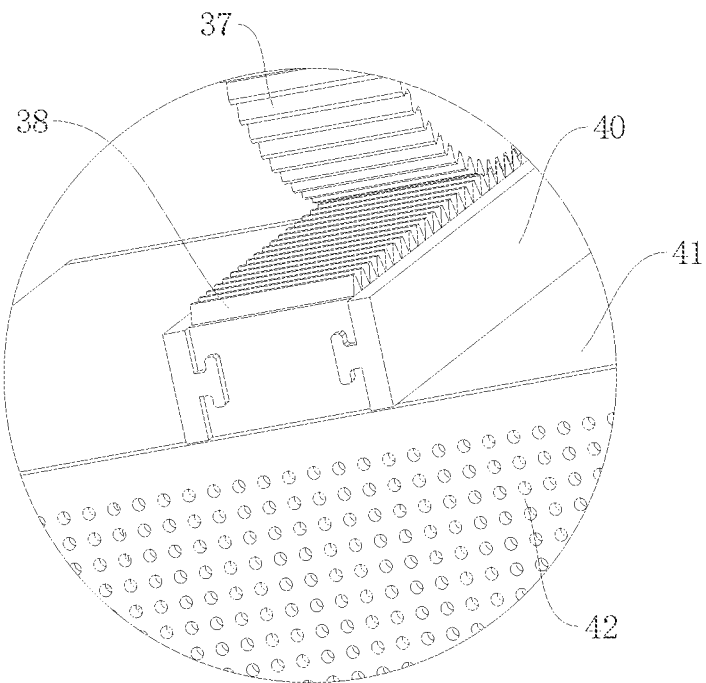
FIG. 5 is a structural enlarged drawing of part B in FIG. 4.
Figure 6:
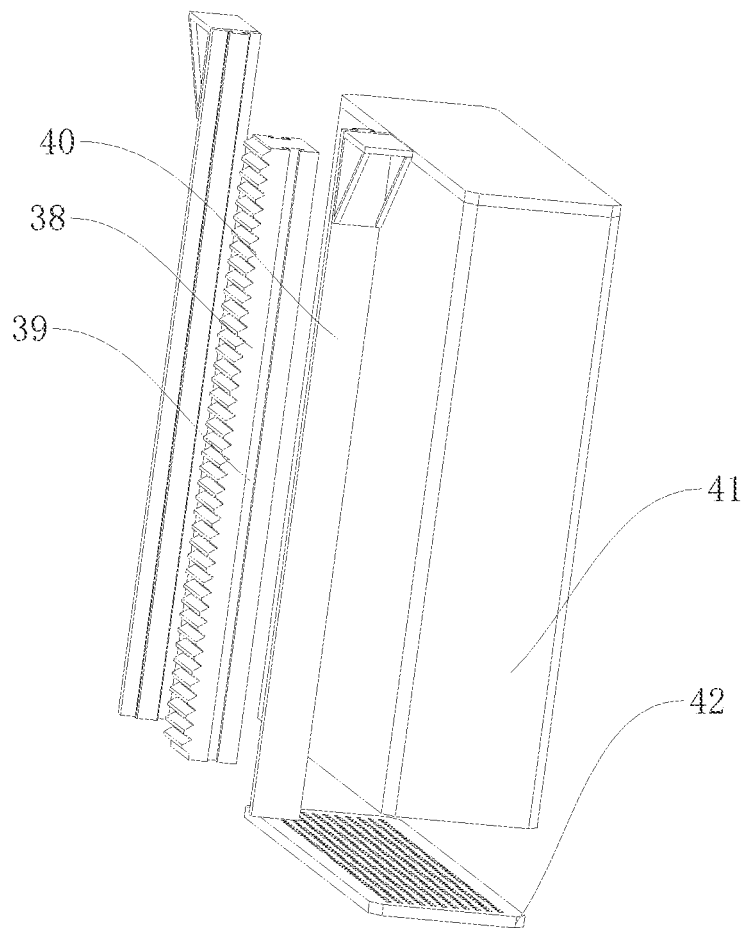
FIG. 6 is an exploded view of stereochemical structure of a vibrating sowing mechanism.
Figure 7:
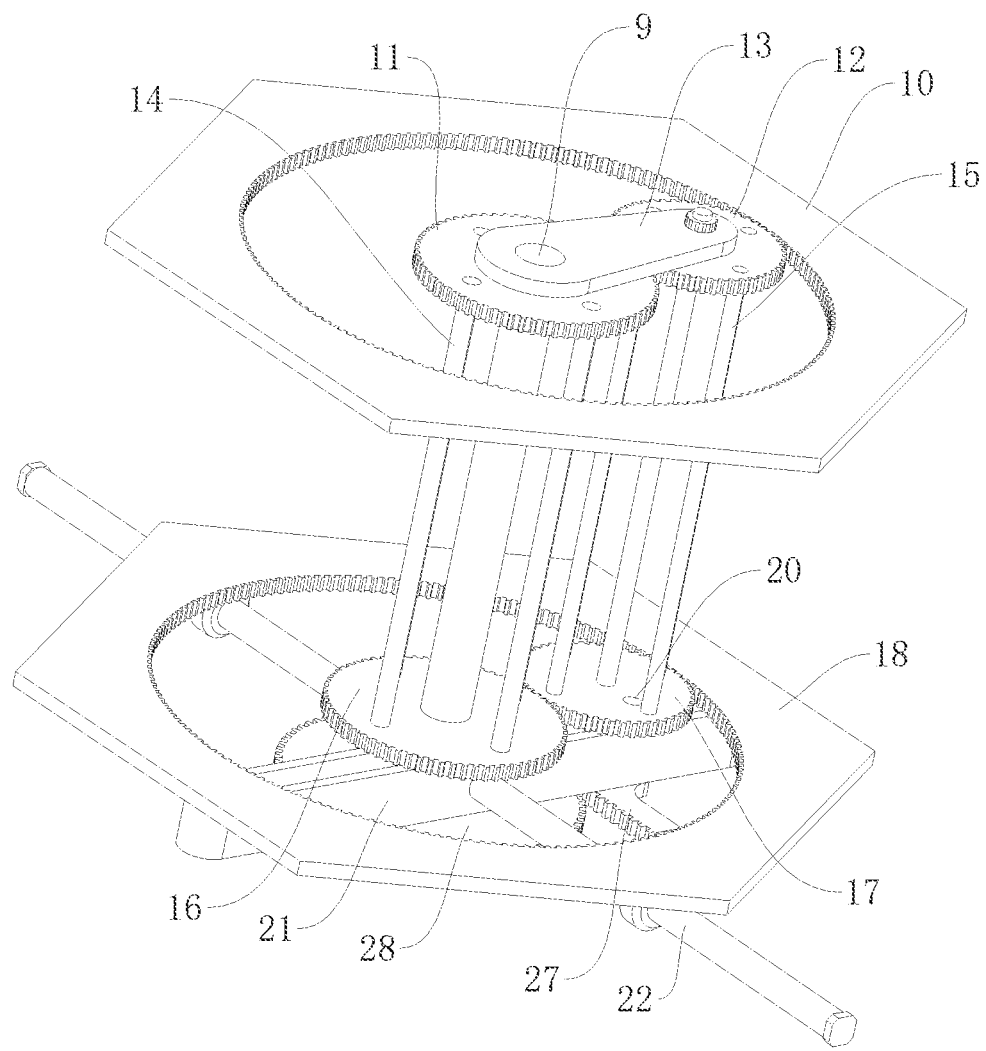
FIG. 7 is a stereochemical structural schematic diagram of a reciprocating water spraying mechanism.
Figure 8:
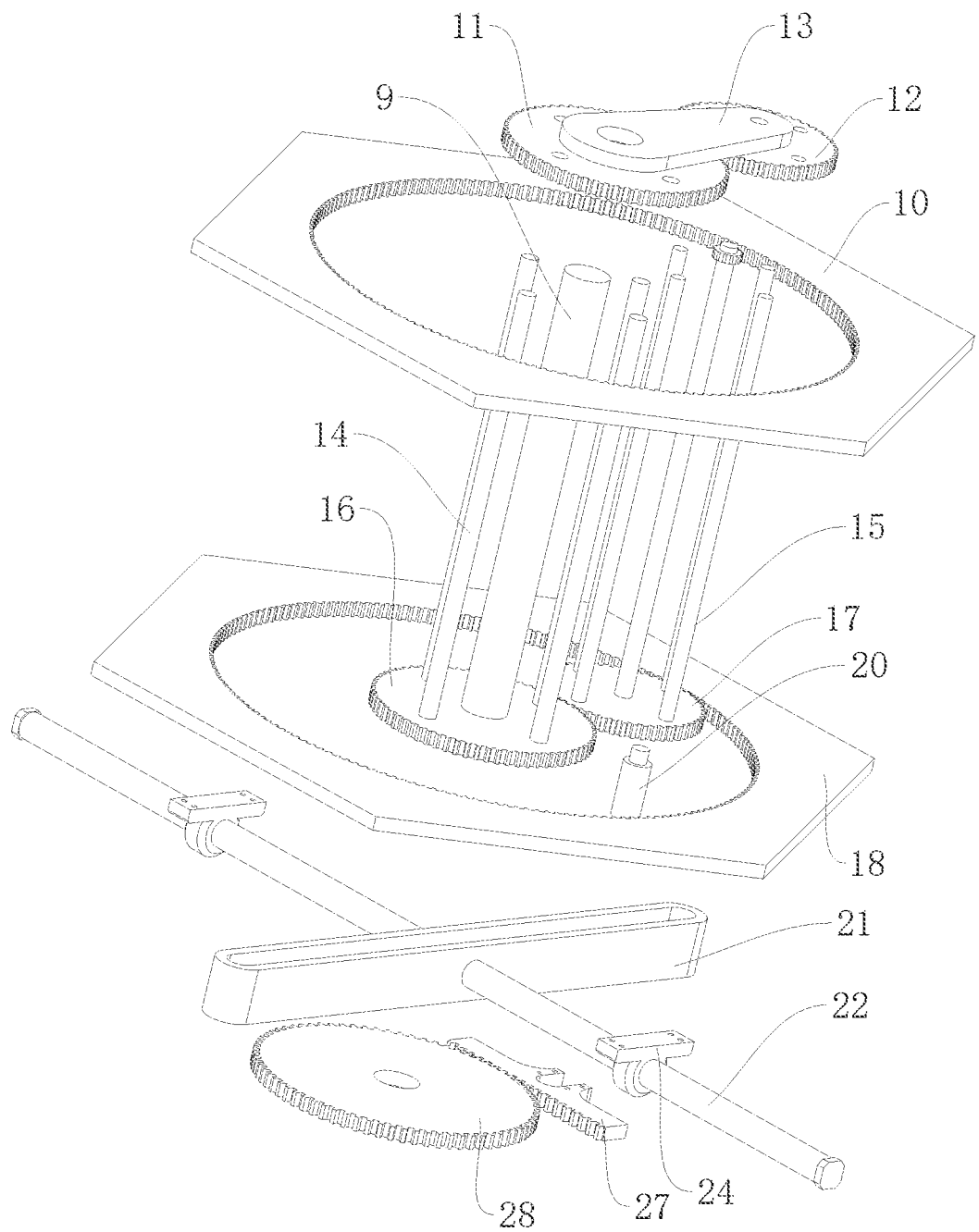
FIG. 8 is an exploded view of stereochemical structure of a reciprocating water spraying mechanism.

Referring to FIG. 1 to FIG. 8, a soil regulation and control device for preventing grassland soil degradation includes:
- a vehicle body 1 arranged in a horizontal state;
- a reaction cylinder 4 which is fixedly arranged above the vehicle body 1 and can accommodate fertilizer and water;
- a mixing and stirring mechanism 7 which is connected with the reaction cylinder 4 and can fully mix the fertilizer and water in the reaction cylinder 4;
- a reciprocating water spraying mechanism 19 which is arranged at a lower end of the mixing and stirring mechanism 7 and can spray the uniformly mixed fertilizer and water;
- a loosening and sowing assembly 25 which includes a reciprocating soil loosening mechanism 26 and a vibrating sowing mechanism 36; the reciprocating soil loosening mechanism 26 is connected with the reciprocating water spraying mechanism 19, the soil loosening mechanism 26 can loosen soil, the vibrating sowing mechanism 36 is connected with the reciprocating soil loosening mechanism 26, and the vibrating sowing mechanism 36 can scatter grass seeds on the loosened soil.

When grass soil restoration is performed, an operator first pours the fertilizer and water into the reaction cylinder 4, and then starts the mixing and stirring mechanism 7 to fully stir the fertilizer and water into mixed liquid. And then, the mixing and stirring mechanism 7 is linked with the reciprocating water spraying mechanism 19 to spray the mixed liquid on the grass soil at equal intervals. At the same time, with the forward movement of the vehicle body 1, the reciprocating water spraying mechanism 19 can also work simultaneously with the reciprocating soil loosening mechanism 26 and the vibration sowing mechanism 36 to sow grass seeds while the soil is overturned.

In order to ensure that the device can be applied to different grassland soils and cannot slip during the process that the device moves forwards, the specific arrangement has the following characteristics.

A cylinder cover 5 is arranged above the reaction cylinder 4. A feed inlet 6 is formed in the cylinder cover 5. Four telescopic wheel seats 2 and four anti-skid wheels 3 are fixedly arranged below the vehicle body 1. The four telescopic wheel seats 2 are fixedly connected with side walls of the vehicle body 1. The four anti-skid wheels 3 are respectively mounted at lower ends of the four telescopic wheel seats 2. When the device is operated, the operator pours the fertilizer and water into the reaction cylinder 4 through the feed inlet 6, and then the telescopic wheel seat 2 drives the anti-skid wheel 3 to rotate. Since the device works in a grassland soil environment, the anti-skid wheel 3 can prevent the vehicle body 1 from slipping during forward moving process, and the telescopic wheel seat 2 is used for adapting to different soil environments, so that the reciprocating soil loosening mechanism 26 can also work normally in different soil environments.

In order to ensure mixing uniformity of the mixing and stirring mechanism 7, the power structure of the mixing and stirring mechanism 7 is specifically provided with the following characteristics.

The mixing and stirring mechanism 7 includes a driving motor 8, a driving shaft 9, a first toothed disc 10, a first driving gear 11, a first driven gear 12 and a fixed connecting rod 13. The first toothed disc 10 is fixedly arranged at an upper end of the reaction cylinder 4. The cylinder cover 5 is fixedly connected with the first toothed disc 10. The driving motor 8 is arranged beside the feed inlet 6 and fixedly connected with an upper end of the cylinder cover 5. The driving shaft 9 is fixedly connected with an output end of the driving motor 8. The first driving gear 11 is coaxially and fixedly connected with the driving shaft 9. The first driven gear 12 is arranged beside the first driving gear 11. The first driven gear 12 is simultaneously meshed with the first driving gear 11 and the first toothed disc 10. One end of the fixed connecting rod 13 is rotatably connected with the driving shaft 9, and the other end of the fixed connecting rod 13 is rotatably connected with the first driven gear 12. When the device is operated, the drive motor 8 is started, the driving shaft 9 is fixedly connected with the output end of the driving motor 8. The drive shaft 9 starts to rotate and drives the first driving gear 11 to rotate. The rotation of the first driving gear 11 can drive the first driven gear 12 meshed with the first driving gear 11 to rotate. Due to the existence of the fixed connecting rod 13, the first driven gear 12 can rotate in the circumferential direction of the first driving gear 11 while rotating.

In order to ensure that the inner and outer layers of the mixed liquid of fertilizer and water can be mixed uniformly and avoid the situation that some fertilizers are not dissolved due to the non-uniform mixing of the inner and outer layers, the specific arrangement has the following characteristics.

The mixing and stirring mechanism 7 further includes a second driving gear 16, a second driven gear 17, a second toothed disc 18, a plurality of first stirring rods 14 and a plurality of second stirring rods 15. The second driving gear 16 is fixedly connected with the lower end of the driving shaft 9. The second driven gear 17 is arranged beside the second driving gear 16 and meshed with the second driving gear 16. The second driven gear 17 is connected with the first driven gear 12 via a long shaft. The first stirring rods 14 are uniformly arrayed along the circumferential direction of the second driving gear 16. One end of each of the first stirring rods 14 is connected with the first driving gear 11, and the other ends of the first stirring rods 14 are connected with the second driving gear 16. The second stirring rods 15 are uniformly arrayed along the circumferential direction of the second driven gear 17. One end of each of the second stirring rods 15 is connected with the first driven gear 12, and the other ends of the second stirring rods 15 are connected with the second driven gear 17. The second toothed disc 18 is meshed with the second driven gear 17. A lower end of the second toothed disc 18 is fixedly connected with the vehicle body 1, and an upper end of the second toothed disc 18 is fixedly connected with the reaction cylinder 4. When the device is operated, with the rotation of the driving shaft 9, the second driving gear 16 starts to rotate and drives the second driven gear 17 meshed with the second driving gear 16 to rotate. At this time, the movement track of the second driven gear 17 coincides with the movement track of the first driven gear 12. In this process, the first stirring rods 14 can revolve along the circumferential direction of the second driving gear 16 with the rotation of the second driving gear 16. At this time, the first stirring rods 14 can stir the inner layer of the mixed liquid of fertilizer and water. The second stirring rods 15 can stir the outer layer of the mixed liquid with the displacement of the second driven gear 17. To sum up, fertilizer and water can be fully mixed and stirred to avoid sediments caused by non-uniform stirring. Because all mechanical parts in the device work in a water working environment, all mechanical parts should be made of stainless steel by default for rust prevention.

The reciprocating water spraying mechanism 19 needs to intermittently spray the mixed liquid of fertilizer and water in order to prevent the fragile and degraded grass seeds from being burned due to excess fertility when the fertilizer is sprayed on the grassland soil. In view of this situation, the device is specifically provided with the following characteristics.

The reciprocating water spraying mechanism 19 includes a linkage stub shaft 20, a reciprocating sliding sleeve 21, two fixed pipe seats 24 and two movable water pipes 22. A plurality of water nozzles 23 are formed in the two movable water pipes 22. The linkage stub shaft 20 is eccentrically connected with a lower end of the second driven gear 17. An inner wall of the reciprocating sliding sleeve 21 is slidably connected with the linkage stub shaft 20. The two movable water pipes 22 are fixedly and respectively connected with both ends of the reciprocating sliding sleeve 21 via water valves. The two fixed pipe seats 24 are invertedly mounted at the lower end of the second toothed disc 18. The two movable water pipes 22 are slidably connected with the two fixed pipe seats 24 respectively. The two movable water pipes 22 are in dynamic sealing connection with an outer wall of the vehicle body 1.

When the device is operated, along with the movement of the second driven gear 17, the linkage stub shaft 20 rotates along the circumferential direction of the second driven gear 17 and also rotates along the circumferential direction of the second driving gear 16. At this time, the linkage stub shaft 20 can slide in a reciprocating manner inside the reciprocating sliding sleeve 21, and both ends of the reciprocating sliding sleeve 21 are respectively connected with the two movable water pipes 22 via the water valves. With the movement of the linkage stub shaft 20, the reciprocating sliding sleeve 21 can perform reciprocating displacement along the axial direction of the two movable water pipes 22, and the two movable water pipes 22 can perform reciprocating displacement with the movement of the reciprocating sliding sleeve 21. During the reciprocating movement of the two movable water pipes 22, the water spraying ports 23 are intermittently blocked by the outer wall of the vehicle body 1 during the reciprocating movement of the movable water pipes 22, so that the mixed liquid of fertilizer and water can be intermittently sprayed on the grassland soil, so as to avoid the fragile and degraded grassland grass seeds from being burned due to excess fertility.

In order to enhance the integration level of the device, reduce the extra power source of the load, reduce the weight of the device and enhance the linkage between structures, the specific arrangement has the following characteristics.

The reciprocating soil loosening mechanism 26 includes a linkage rack 27, a reciprocating gear 28, a power worm 29, a driving bevel gear 30 and two driven bevel gears 31. The linkage rack 27 is fixedly connected with the lower end of the reciprocating sliding sleeve 21. The reciprocating gear 28 and the driving shaft 9 are coaxially arranged and meshed with the linkage rack 27. The power worm 29 is coaxially and fixedly connected with the reciprocating gear 28. The power worm 29 passes through a lower end of the vehicle body 1 and is in dynamic sealing connection with the vehicle body 1. The driving bevel gear 30 is fixedly connected with a lower end of the power worm 29. The two driven bevel gears 31 are symmetrically arranged beside the driving bevel gear 30 and meshed with the driving bevel gear 30. When the device is operated, the movement of the reciprocating sliding sleeve 21 can drive the linkage rack 27 to move. The movement of the linkage rack 27 can drive the reciprocating gear 28 meshed with the linkage rack 27 to rotate in a reciprocating manner. The rotation of the reciprocating gear 28 can drive the power worm 29 fixedly connected with the reciprocating gear 28 to rotate. The rotation of the power worm 29 can drive the driving bevel gear 30 connected with the power worm 29 to rotate. The rotation of the driving bevel gear 30 can drive the two driven bevel gears 31 meshed with the driving bevel gear 30 to rotate.

In order that the device can turn over the grassland soil in the forward moving process, the specific arrangement has the following characteristics.

The reciprocating soil loosening mechanism 26 further includes a bevel gear frame 32, two soil loosening plows 34, two fixed supports 33 and two fixed seats 35. The bevel gear frame 32 sleeves the driving bevel gear 30 and the two driven bevel gears 31. One end of each of the two fixed supports 33 is fixedly connected with the bevel gear frame 32, and the other ends of the two fixed supports 33 are fixedly connected with the lower end of the vehicle body 1. One end of each of the two soil loosening plows 34 is respectively connected with the two driven bevel gears 31. The lower ends of the two fixed seats 35 are respectively connected with the other ends of the two soil loosening plows 34 via bearings, and the upper ends of the two fixed seats 35 are connected with the lower end of the vehicle body 1. When the device is operated, the rotation of the two driven bevel gears 31 can drive the two soil loosening plows 34 to rotate. Since the two driven bevel gears 31 turn in opposite directions, plow teeth of the two soil loosening plows 34 should be opposite, and the two soil loosening plows 34 can loosen the grassland soil. The bevel gear frame 32 and the fixed support 33 can ensure that the driving bevel gear 30 and the driven bevel gear 31 do not move in the transmission process, and the two fixed seats 35 can ensure that the soil loosening plow 34 does not move.

In order that the grass seeds can be sown on soil in the soil overturning process, the specific arrangement has the following characteristics.

The vibrating sowing mechanism 36 includes a power worm gear 37, a reciprocating rack 38, a blanking screen mesh 42, a grass seed material box 41 and two limiting sliding seats 40. The power worm gear 37 is arranged beside the power worm 29 and meshed with the power worm 29. The reciprocating rack 38 is arranged on the side, away from the power worm 29, of the power worm gear 37. The power worm gear 37 is coaxially and fixedly connected with a helical gear. The helical gear is meshed with the reciprocating rack 38. Limiting chutes 39 are formed in both sides of the reciprocating rack 38. The two limiting sliding seats 40 are respectively arranged at both ends of the reciprocating rack 38 and slidably connected with the limiting chutes 39. The upper ends of the two limiting sliding seats 40 are respectively fixedly connected with the lower end of the vehicle body 1. The grass seed material box 41 is fixedly connected with the end, away from the power worm gear 37, of the reciprocating rack 38. The blanking screen mesh 42 is fixedly connected with a lower end of the grass seed material box 41. The limiting sliding seat 40 provides support for the reciprocating rack 38. The rotation of the power worm 29 can drive the power worm 37 to rotate. The rotation of the power worm 37 can drive the helical gear fixedly connected to the power worm 37 to rotate. The rotation of the helical gear can drive the reciprocating rack 38 meshed with the helical gear to reciprocate in the vertical direction. In this process, compared with a spur gear, the helical gear is high in meshing performance, stable in transmission and large in overlapping degree. In the transmission process, the load on the gear is reduced, the bearing capacity of the gear is improved, and the displacement of the reciprocating rack 38 in the vertical direction is facilitated. The movement of the reciprocating rack 38 can drive the grass seed material box 41 to move. When the grass seed material box 41 reciprocates up and down, the grass seeds inside the grass seed material box 41 can be vibrated and lowered through the blanking screen 42, so that the grass seeds can be sprinkled on the grass soil that has been overturned.

The working principle of that device is as follows: before the device operates, the operator firstly introduces fertilizer and water into the reaction cylinder 4 through the feed inlet 6. At this time, the driving motor 8 is started and finally drives the first stirring rod 14 and the second stirring rod 15 to rotate, so that the inner and outer layers of the mixed liquid of fertilizer and water are uniformly stirred to avoid the phenomenon of precipitated or undissolved fertilizer in the mixed liquid. In this process, the water valves at the two movable water pipes 22 are in a closed state to avoid the exposure of the mixed liquid that is not stirred uniformly, but a small amount of mixed liquid can flow back into the movable water pipes 22 through water spray pipes and seep out with the movement of the movable water pipes 22. At this time, the operator can preliminarily judge whether the fertilizer and water are mixed through a small amount of seeped mixed liquid, and then start the vehicle body 1 to move on the grassland soil.

When the vehicle body 1 moves on the grass soil, it can be seen from the foregoing that the soil loosening plow 34 can turn over the soil, and the reciprocating rack 38 can drive the grass seed material box 41 to reciprocate in the vertical direction. With the movement of the grass seed material box 41, the grass seeds can be shaken and fallen on overturned soil blocks, and the sowing work is completed at this time. In this process, meshing teeth of the reciprocating rack 38 should be matched with the power worm gear 37 to prevent the reciprocating rack 38 from being unable to move.

When the device is operated, the operator should drive the vehicle body 1 to move repeatedly on the grass soil, so that fertilizer and water can be fully sprayed on the grass. In this process, the operator can pour fertilizer and water into the reaction cylinder 4 at any time to realize the continuity of the operation of the device.

The above embodiments only express be one or more embodiments of the present disclosure, and the description is specific and detailed, but cannot be construed as limiting the claims of the present disclosure. It should be noted that several modifications and improvements may also be made to those skilled in the art without departing from the inventive concept, which fall within the scope of the present disclosure. Therefore, the protection scope of the present disclosure shall be subject to the protection scope of the claims.

What is claimed is:

1. A soil regulation and control device for preventing grassland soil degradation, comprising:
   a vehicle body (1) arranged in a horizontal state;
   a reaction cylinder (4) fixedly arranged above the vehicle body (1) and being capable of accommodating fertilizer and water;
   a mixing and stirring mechanism (7) connected with the reaction cylinder (4) and being capable of fully mixing the fertilizer and water in the reaction cylinder (4);
   a reciprocating water spraying mechanism (19) arranged at a lower end of the mixing and stirring mechanism (7) and being capable of spraying uniformly mixed fertilizer and water;
   a loosening and sowing assembly (25) including a reciprocating soil loosening mechanism (26) connected with the reciprocating water spraying mechanism (19) and being capable of loosening soil, and a vibrating sowing mechanism (36) connected with the reciprocating soil loosening mechanism (26) and being capable of scattering grass seeds on the loosened soil,
   wherein the reciprocating water spraying mechanism (19) comprises a linkage stub shaft (20), a reciprocating sliding sleeve (21), two fixed pipe seats (24) and two movable water pipes (22), a plurality of water nozzles (23) are formed in the two movable water pipes (22), the linkage stub shaft (20) is eccentrically connected with a lower end of a second driven gear (17), an inner wall of the reciprocating sliding sleeve (21) is slidably connected with the linkage stub shaft (20), the two movable water pipes (22) are fixedly and respectively connected with both ends of the reciprocating sliding sleeve (21) via water valves, the two fixed pipe seats (24) are invertedly mounted at the lower end of a second toothed disc (18), the two movable water pipes (22) are slidably connected with the two fixed pipe seats (24) respectively, and the two movable water pipes (22) are in dynamic sealing connection with an outer wall of the vehicle body (1);
   wherein the vibrating sowing mechanism (36) comprises a power worm gear (37), a reciprocating rack (38), a blanking screen mesh (42), a grass seed material box (41) and two limiting sliding seats (40), the power worm gear (37) is arranged beside and meshed with a power worm (29), the reciprocating rack (38) is arranged on a side, away from the power worm (29), of the power worm gear (37), the power worm gear (37) is coaxially and fixedly connected with a helical gear meshed with the reciprocating rack (38), limiting chutes (39) are formed in both sides of the reciprocating rack (38), the two limiting sliding seats (40) are respectively arranged at both sides of the reciprocating rack (38) and slidably connected with the limiting chutes (39), upper ends of the two limiting sliding seats (40) are fixedly connected with the lower end of the vehicle body (1), the grass seed material box (41) is fixedly connected with an end, away from the power worm gear (37), of the reciprocating rack (38), and the blanking screen mesh (42) is fixedly connected with a lower end of the grass seed material box (41);
   wherein the mixing and stirring mechanism (7) comprises a driving motor (8), a driving shaft (9), a first toothed disc (10), a first driving gear (11), a first driven gear (12) and a fixed connecting rod (13), the first toothed disc (10) is fixedly arranged at an upper end of the reaction cylinder (4), a cylinder cover (5) is fixedly connected with the first toothed disc (10), the driving motor (8) is arranged beside a feed inlet (6) and fixedly connected with an upper end of the cylinder cover (5), the driving shaft (9) is fixedly connected with an output end of the driving motor (8), the first driving gear (11) is coaxially and fixedly connected with the driving shaft (9), the first driven gear (12) is arranged beside the first driving gear (11) and simultaneously meshed with the first driving gear (11) and the first toothed disc (10), one end of the fixed connecting rod (13) is rotatably connected with the driving shaft (9), and an other end of the fixed connecting rod (13) is rotatably connected with the first driven gear (12);
   wherein the mixing and stirring mechanism (7) further comprises a second driving gear (16), the second driven gear (17), the second toothed disc (18), a plurality of first stirring rods (14) and a plurality of second stirring rods (15), the second driving gear (16) is fixedly connected with a lower end of the driving shaft (9), the second driven gear (17) is arranged beside the second driving gear (16) and meshed with the second driving gear (16), the second driven gear (17) is connected with the first driven gear (12) via a long shaft, the plurality of first stirring rods (14) are uniformly arrayed along a circumferential direction of the second driving gear (16), one end of each of the plurality of first stirring rods (14) is connected with the first driving gear (11), an other end of each of the plurality of first stirring rods (14) is connected with the second driving gear (16), the plurality of second stirring rods (15) are uniformly arrayed along a circumferential direction of the second driven gear (17), one end of each of the plurality of second stirring rods (15) is connected with the first driven gear (12), an other end of each of the plurality of second stirring rods (15) is connected with the second driven gear (17), the second toothed disc (18) is meshed with the second driven gear (17), a lower end of the second toothed disc (18) is fixedly connected with the vehicle body (1), and an upper end of the second toothed disc (18) is fixedly connected with the reaction cylinder (4);

wherein the reciprocating soil loosening mechanism (26) comprises a linkage rack (27), a reciprocating gear (28), the power worm (29), a driving bevel gear (30) and two driven bevel gears (31), the linkage rack (27) is fixedly connected with a lower end of the reciprocating sliding sleeve (21), the reciprocating gear (28) is coaxially arranged with the driving shaft (9) and meshed with the linkage rack (27), the power worm (29) is coaxially and fixedly connected with the reciprocating gear (28), the power worm (29) passes through a lower end of the vehicle body (1) and is in dynamic sealing connection with the vehicle body (1), the driving bevel gear (30) is fixedly connected with a lower end of the power worm (29), and the two driven bevel gears (31) are symmetrically arranged beside and meshed with the driving bevel gear (30);

wherein the reciprocating soil loosening mechanism (26) further comprises a bevel gear frame (32), two soil loosening plows (34), two fixed supports (33) and two fixed seats (35), the bevel gear frame (32) sleeves the driving bevel gear (30) and the two driven bevel gears (31), one end of each of the two fixed supports (33) is fixedly connected with the bevel gear frame (32), an other end of each of the two fixed supports (33) is fixedly connected with the lower end of the vehicle body (1), first ends of the two soil loosening plows (34) are respectively connected with the two driven bevel gears (31), lower ends of the two fixed seats (35) are respectively connected with second ends of the two soil loosening plows (34) via bearings, and upper ends of the two fixed seats (35) are connected with the lower end of the vehicle body (1).

2. The soil regulation and control device for preventing grassland soil degradation according to claim 1, wherein the cylinder cover (5) is arranged above the reaction cylinder (4), the feed inlet (6) is formed in the cylinder cover (5); four telescopic wheel seats (2) and four anti-skid wheels (3) are fixedly arranged below the vehicle body (1), the four telescopic wheel seats (2) are fixedly connected with side walls of the vehicle body (1), and the four anti-skid wheels (3) are respectively mounted at lower ends of the four telescopic wheel seats (2).

* * * * *